US012145275B2

(12) United States Patent
Nakata et al.

(10) Patent No.: US 12,145,275 B2
(45) Date of Patent: Nov. 19, 2024

(54) ROBOT CONTROL METHOD AND ROBOT CONTROL DEVICE

(71) Applicant: Panasonic Intellectual Property Management Co., Ltd., Osaka (JP)

(72) Inventors: Hiroyuki Nakata, Osaka (JP); Hiroyoshi Ueda, Osaka (JP); Ryosuke Yamamoto, Osaka (JP); Atsumi Hashimoto, Osaka (JP); Yasuyoshi Honuchi, Osaka (JP); Masayoshi Iwatani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 264 days.

(21) Appl. No.: 17/676,904

(22) Filed: Feb. 22, 2022

(65) Prior Publication Data

US 2022/0176557 A1    Jun. 9, 2022

Related U.S. Application Data

(63) Continuation of application No. PCT/JP2020/040180, filed on Oct. 27, 2020.

(30) Foreign Application Priority Data

Nov. 21, 2019    (JP) .................. 2019-210457

(51) Int. Cl.
*G06F 17/00*     (2019.01)
*B25J 9/16*      (2006.01)
*B25J 13/08*     (2006.01)

(52) U.S. Cl.
CPC ............ *B25J 9/1641* (2013.01); *B25J 13/088* (2013.01)

(58) Field of Classification Search
CPC ........ B25J 9/1641; B25J 13/088; B25J 13/00; G05B 2219/41078; G05B 2219/41083; G05B 2219/41084
USPC ....................................... 700/254
See application file for complete search history.

(56) References Cited

U.S. PATENT DOCUMENTS

| 6,252,368 | B1 | 6/2001 | Sugie | |
| 7,072,740 | B2 * | 7/2006 | Iribe | G06N 3/008 |
| | | | | 318/568.22 |
| 7,842,904 | B2 * | 11/2010 | Nakata | B23K 9/125 |
| | | | | 219/124.01 |

(Continued)

FOREIGN PATENT DOCUMENTS

| EP | 2390064 | | 11/2011 | |
| EP | 2752274 | B1 * | 12/2020 | ............ B25J 9/1641 |
| JP | 3703664 | B | 10/2005 | |

OTHER PUBLICATIONS

Controlling mechanical systems with backlash. (Year: 2000).*

(Continued)

*Primary Examiner* — Ronnie M Mancho
(74) *Attorney, Agent, or Firm* — WENDEROTH, LIND & PONACK, L.L.P.

(57) ABSTRACT

Stop and start detection block (63) determines whether or not a joint portion is in a stopped state before a rotation direction of the joint portion is inverted based on stop flag signal (Stop_Flg). When it is determined that the joint portion is in the stopped state, filter processing block (65) changes a frequency component of a correction amount for correcting backlash to a low frequency lower than a predetermined threshold value.

5 Claims, 12 Drawing Sheets

(56) References Cited

U.S. PATENT DOCUMENTS

| | | | | |
|---|---|---|---|---|
| 8,170,719 B2* | 5/2012 | Tsusaka | ............... | G05B 19/423 |
| | | | | 700/257 |
| 8,175,749 B2* | 5/2012 | Tsusaka | ................ | B25J 9/1633 |
| | | | | 700/254 |
| 8,290,621 B2* | 10/2012 | Tsusaka | ................... | B25J 13/08 |
| | | | | 700/250 |
| 11,413,759 B2* | 8/2022 | Shino | ..................... | B25J 9/1694 |
| 2004/0176875 A1* | 9/2004 | Iribe | .................... | B62D 57/032 |
| | | | | 318/568.12 |
| 2007/0119841 A1* | 5/2007 | Nakata | ................ | B23K 9/0671 |
| | | | | 219/137.71 |
| 2019/0168389 A1* | 6/2019 | Shino | .................... | B25J 13/088 |

OTHER PUBLICATIONS

Indian Examination Report issued Aug. 24, 2022 in corresponding Indian Patent Application No. 202247017013.
International Search Report of PCT application No. PCT/JP2020/040180 dated Dec. 28, 2020.

\* cited by examiner

ROBOT CONTROL METHOD AND ROBOT CONTROL DEVICE

This application is a continuation of the PCT International Application No. PCT/JP2020/040180 filed on Oct. 27, 2020, which claim the benefit of foreign priority of Japanese patent application No. 2019-210457 filed on Nov. 21, 2019, the contents all of which are incorporated herein by reference.

TECHNICAL FIELD

The present disclosure relates to a robot control method and a robot control device.

BACKGROUND ART

In the related art, it is known that, when a rotation direction of a motor is inverted, a so-called backlash error occurs in which a target movement amount of a control numerical value does not match a relative movement amount of a table or a workpiece (see, for example, PTL 1).

PTL 1 discloses a configuration in which backlash correction is performed by reducing a magnitude of a step signal after correction in a level ratio corresponding to an elapsed time after inversion of an increasing and decreasing direction of a position command signal and outputting the step signal as a position correction signal (backlash information).

CITATION LIST

Patent Literature

PTL 1: Japanese Patent No. 3703664

SUMMARY OF THE INVENTION

Technical Problem

For example, while a distal end portion of a robot arm is moved in a circular orbit, a rotation direction is inverted without stopping a motor of a turning shaft. Here, when the rotation direction is inverted in the middle of an operation of the motor, a correction amount is steeply changed such that a timing of the backlash correction is not delayed.

On the other hand, when the rotation direction of the motor is inverted from a state where the robot arm is stopped and when the correction amount is steeply changed like a case where the rotation direction is inverted in the middle of the operation of the motor, a large fluctuation occurs in the turning shaft, and the robot arm vibrates. Thus, there is a concern that a trajectory error increases.

The present disclosure has been made in view of such a point, and an object of the present disclosure is to reduce a trajectory error of a robot arm.

Solution to Problem

The present disclosure provides the following means for solving the problem for a robot control method for controlling an operation of a robot arm having a plurality of joint portions.

That is, according to a first invention, the robot control method includes
  determining whether or not the joint portion is in a stopped state before a rotation direction of the joint portion to be corrected among the plurality of joint portions is inverted, and
  changing a frequency component of a correction amount for correcting backlash at the joint portion to a low frequency lower than a predetermined threshold value when it is determined that the joint portion is in the stopped state.

In the first invention, it is determined whether the joint portion to be corrected is in the stopped state before the joint portion is inverted. In the stopped state, the frequency component of the correction amount is changed to the low frequency lower than the predetermined threshold value.

As described above, when the joint portion to be corrected is inverted from the stopped state, the correction amount can be gently changed by lowering the frequency component of the correction amount. As a result, it is possible to suppress vibration in the robot arm due to a large fluctuation in the joint portion, and it is possible to reduce a trajectory error of the robot arm.

In the first invention, according to a second invention,
  the robot control method further includes
  determining whether or not the joint portion is in a middle of an operation before the rotation direction of the joint portion to be corrected among the plurality of joint portions is inverted, and
  changing the frequency component of the correction amount to a high frequency higher than the low frequency when it is determined that the joint portion is in the middle of the operation.

In the second invention, it is determined whether or not the joint portion to be corrected is in the middle of the operation before the joint portion is inverted. In the middle of the operation, the frequency component of the correction amount is changed to the high frequency higher than the low frequency.

As described above, when the joint portion to be corrected is inverted in the middle of the operation, the correction amount can be steeply changed by increasing the frequency component of the correction amount. As a result, the timing of the backlash correction can be prevented from being delayed, and responsiveness can be enhanced.

According to a third invention, there is provided a robot control device for controlling an operation of a robot arm having a plurality of joint portions. The robot control device includes
  a determination unit that determines whether or not the joint portion is in a stopped state before a rotation direction of the joint portion to be corrected among the plurality of joint portions is inverted, and
  a frequency changing unit that changes a frequency component of a correction amount for correcting backlash at the joint portion to a low frequency lower than a predetermined threshold value when it is determined that the joint portion is in the stopped state.

In the third invention, it is determined whether or not the joint portion to be corrected is in the stopped state before the joint portion is inverted. In the stopped state, the frequency component of the correction amount is changed to the low frequency lower than the predetermined threshold value.

As described above, when the joint portion to be corrected is inverted from the stopped state, the correction amount can be gently changed by lowering the frequency component of the correction amount. As a result, it is possible to suppress vibration in the robot arm due to a large fluctuation in the joint portion, and it is possible to reduce a trajectory error of the robot arm.

In the third invention, according a fourth invention,
  the determination unit determines whether or not the joint portion is in a middle of an operation before the rotation direction of the joint portion to be corrected among the plurality of joint portions is inverted, and the frequency changing unit changes the frequency component of the correction amount to a high frequency higher than the low frequency when it is determined that the joint portion is in the middle of the operation.

In the fourth invention, it is determined whether or not the joint portion to be corrected is in the middle of the operation before the joint portion is inverted. In the middle of the operation, the frequency component of the correction amount is changed to the high frequency higher than the low frequency.

As described above, when the joint portion to be corrected is inverted in the middle of the operation, the correction amount can be steeply changed by increasing the frequency component of the correction amount. As a result, the timing of the backlash correction can be prevented from being delayed, and responsiveness can be enhanced.

Advantageous Effect of Invention

In accordance with the present disclosure, the trajectory error of the robot arm can be reduced.

DESCRIPTION OF EMBODIMENT

Hereinafter, an exemplary embodiment of the present disclosure is described with reference to the drawings. Note that the following description of the preferred exemplary embodiment is merely exemplary in nature, and is not intended to limit the present disclosure, its application, or its use.

Figure 1:
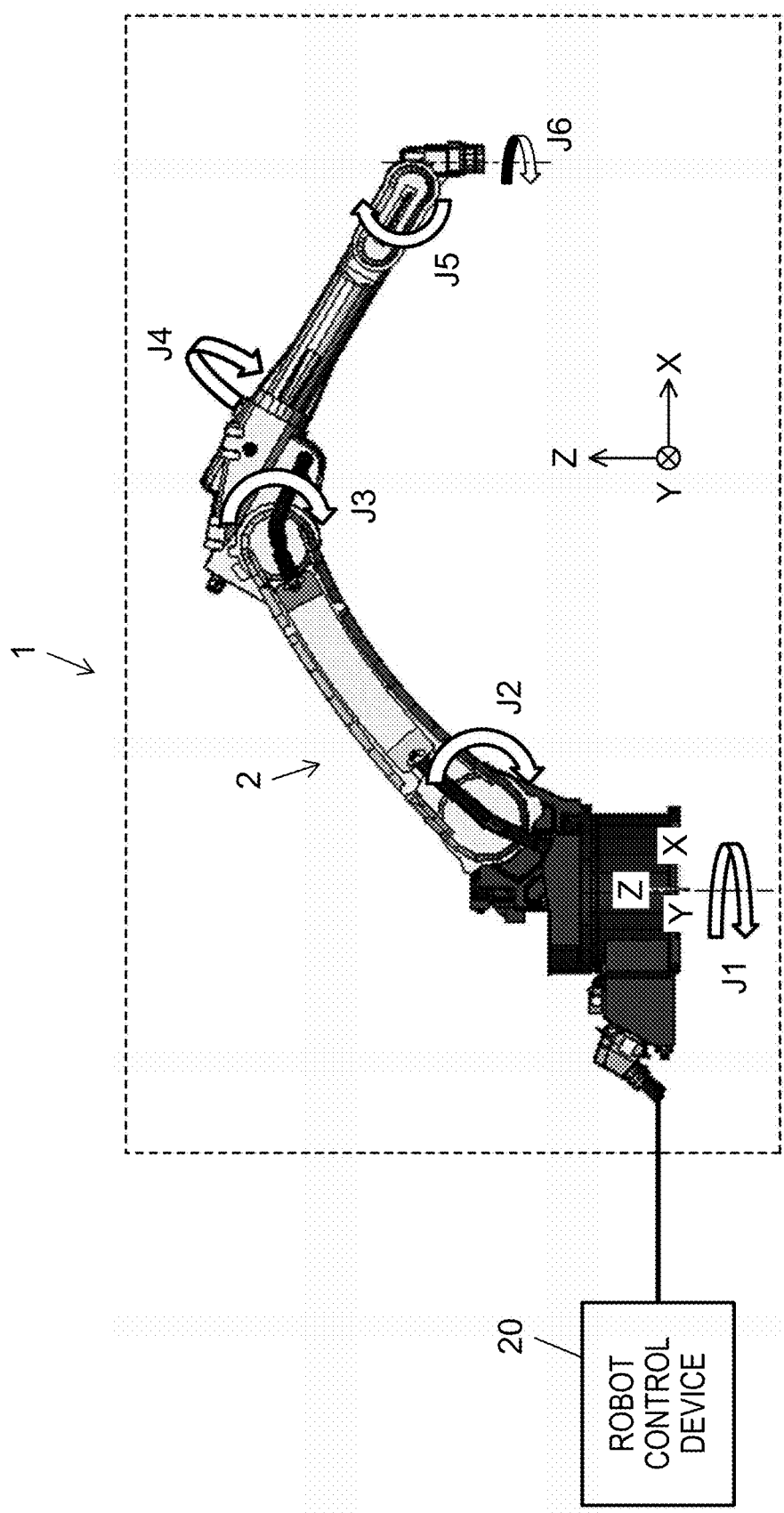
FIG. 1 is a diagram illustrating a configuration of a robot according to the present exemplary embodiment.

As illustrated in FIG. 1, vertical articulated robot 1 includes robot arm 2 and a plurality of joint portions J1 to J6. Robot control device 20 is connected to robot 1.

Robot arm 2 is divided into a plurality of portions, and joint portions J1 to J6 are provided at coupling portions of the portions. Servomotors 12 are coupled to joint portions J1 to J6 via reduction gears 13 (see FIG. 6).

Servomotor 12 is driven based on position command θc from robot control device 20 to rotate each of joint portions J1 to J6 by a desired amount, and an operation and a posture of robot arm 2 are controlled.

Here, joint portions J1 to J3 are three main shafts that determine the overall posture of robot arm 2, and joint portions J4 to J6 are three wrist shafts that determine a direction of a distal end of robot arm 2. Note that joint portion J1 is a turning shaft for turning robot arm 2.

Hereinafter, a case where a laser output device (not illustrated) is attached to the distal end of robot arm 2 and a work of cutting a workpiece is performed by irradiation with laser light will be described.

Figure 2:
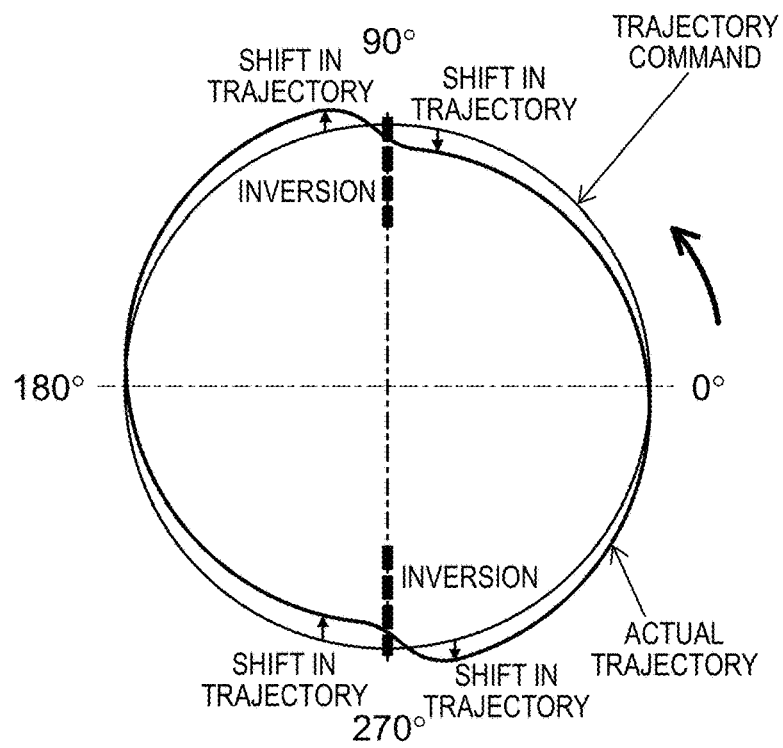
FIG. 2 is a diagram illustrating a trajectory error.

In the example illustrated in FIG. 2, laser cutting is performed in a circular orbit in a counterclockwise direction from a position of 0°. Here, as will be described later in FIG. 6, upon receiving an instruction from operation and teaching unit 21, a rotation direction of motor 12 of joint portion J1 is inverted at a timing when the distal end of robot arm 2 reaches positions of 90° and 270° in FIG. 2. Thus, backlash errors occur at the positions of 90° and 270°, respectively.

Specifically, an actual trajectory is a trajectory in which a portion on a right side of an inversion position in FIG. 2, that is, a semicircular portion from the position of 270° to the position of 90° is shifted downward without changing a diameter itself.

A portion on a left side of the inversion position in FIG. 2, that is, a semicircular portion from the position of 90° to the position of 270° is a trajectory shifted upward without changing the diameter itself.

As described above, the actual trajectory is a trajectory in which the right side of the reverse position is shifted downward and the left side of the reverse position is shifted upward in FIG. 2.

Figure 3:
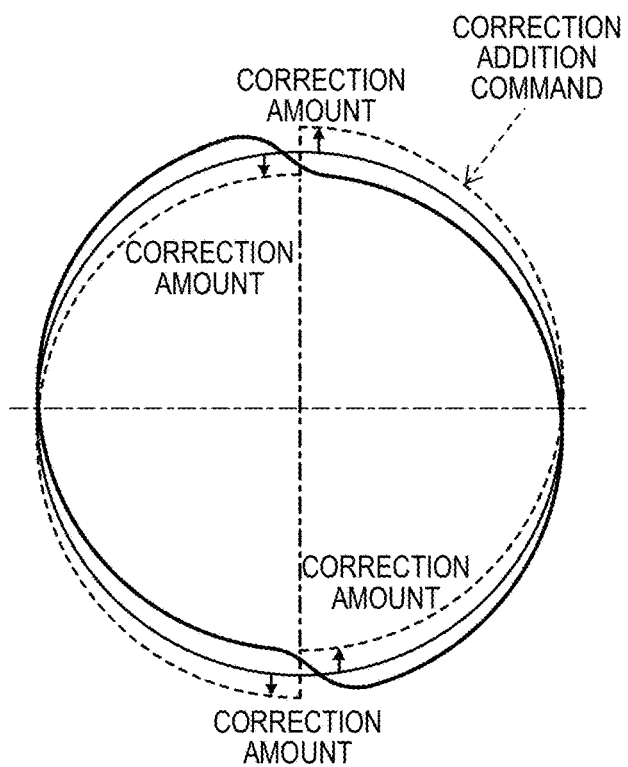
FIG. 3 is a diagram when the trajectory error is corrected by a backlash correction amount.

Thus, as illustrated in FIG. 3, correction is performed such that the actual trajectory approaches a target trajectory by adding or subtracting a backlash correction amount to or from the position command. Specifically, the position command is corrected to a position command shifted upward in FIG. 3 by adding the backlash correction amount to the position command from the position of 0° to the position of 90° and from the position of 270° to the position of 360° (0°).

On the other hand, the position command is corrected to a position command shifted downward in FIG. 3 by subtracting a correction amount (θ1BL) from the position command from the position 90° to the position of 270°.

Figure 4:
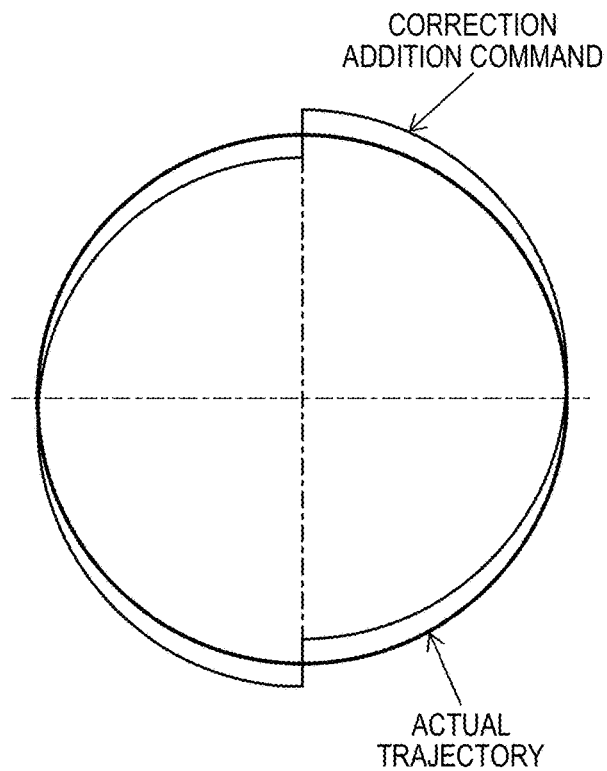
FIG. 4 is a diagram illustrating an actual trajectory after correction.

As described above, it is possible to perform correction such that the actual trajectory of robot arm 2 becomes a circular orbit by providing a correction addition command as illustrated in FIG. 4.

Figure 5:
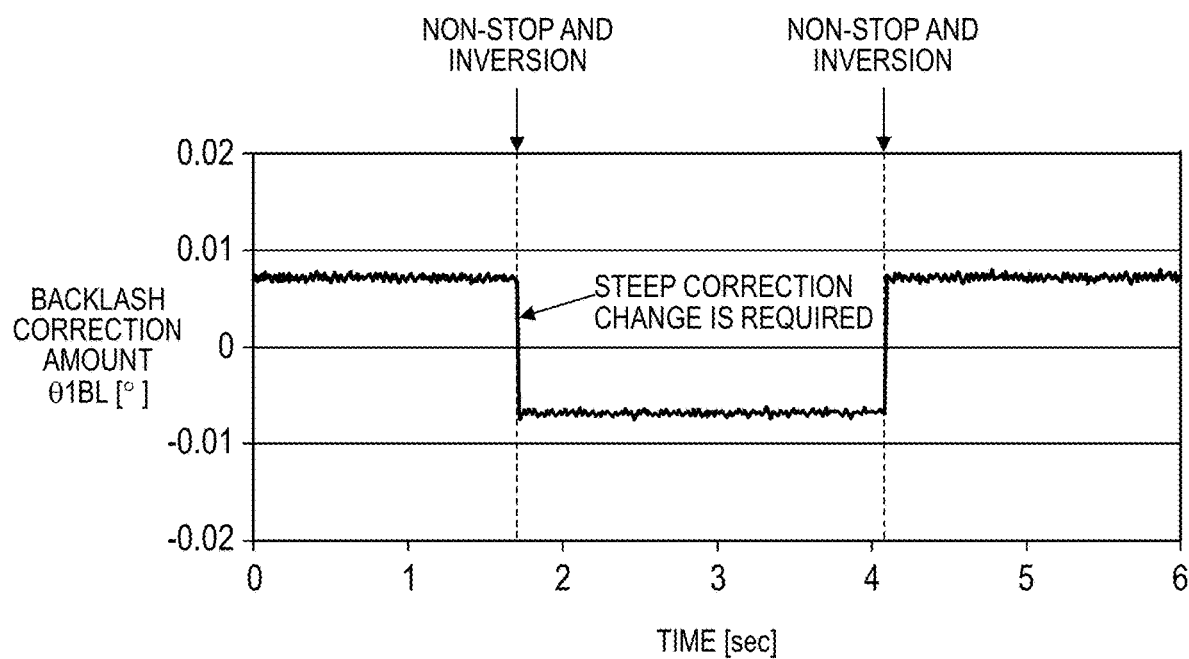
FIG. 5 is a graph showing a change in the backlash correction amount.

Here, the backlash correction amount is a value determined in advance by an experiment or the like. For example, a waveform illustrated in FIG. 5 is output as the backlash correction amount. In the example shown in FIG. 5, while the distal end of robot arm 2 is moved in a circular orbit, as will be described later in FIG. 6, upon receiving an instruction from operation and teaching unit 21, servomotor 12 of joint portion J1 is inverted without stopping. Thus, when servomotor 12 is inverted from a non-stopped state, the correction amount is steeply changed such that a timing of the backlash correction is not delayed.

<Configuration of Articulated Robot and Control System Thereof>

Figure 6:
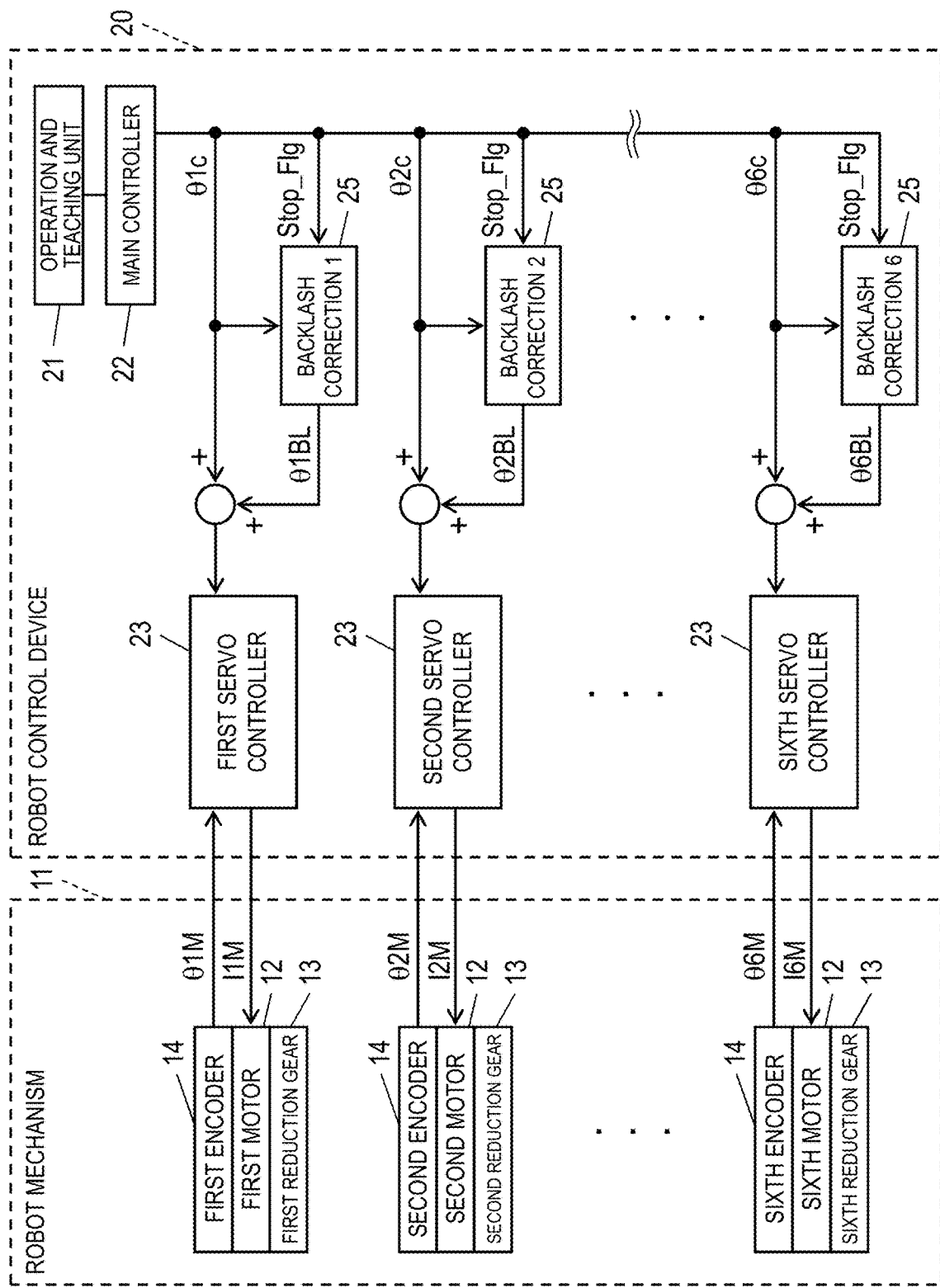
FIG. 6 is a functional block diagram related to position control of the robot.

FIG. 6 is a functional block diagram related to position control of the robot, and schematically illustrates internal configurations of robot mechanism 11 and robot control device 20.

As illustrated in FIG. 6, robot mechanism 11 is a mechanical drive unit of robot 1, and includes servomotors 12 (hereinafter, simply referred to as motors), reduction gears 13, and encoders 14. Although not illustrated, robot arm 2 is included.

Motors 12 are coupled to joint portions J1 to J6 of robot 1 via reduction gear 13, and drives joint portions J1 to J6 by control signals sent from servo controllers 23 of robot control device 20 to control the operation and posture of robot arm 2. In robot 1, joint portions J1 to J6 can be operated to draw a desired orbit such as a circle or an ellipse at the distal end of robot arm 2.

Encoder 14 is connected to motor 12, detects a rotation amount and a rotational speed thereof, and sends, as a feedback signal, a detection signal to servo controller 23.

Note that, in the following description, motor 12, reduction gear 13, and encoder 14 coupled to joint portion J1 may be referred to as a "first motor", a "first reduction gear", and a "first encoder", respectively, and the motors and the like coupled to joint portions J2 to J6 may be referred to as "second to sixth motors" and the like, respectively.

Servo controller 23 and backlash correction block 25 connected to the first motor may be referred to as a "first servo controller" and a "first backlash correction block", respectively, and servo controllers 23 connected to second to sixth motors 12 and backlash correction blocks 25 connected to second to sixth servo controllers 23 may be referred to as "second to sixth servo controllers" and "second to sixth backlash correction blocks", respectively.

The position commands and position command correction values sent to the shafts may be referred to as position commands θ1c to θ6c and position command correction values θ1BL to θ6BL.

Robot control device 20 includes operation and teaching unit 21, main controller 22, servo controllers 23, and backlash correction blocks 25.

Operation and teaching unit 21 stores, for example, the trajectory of robot arm 2 acquired at the time of teaching, a rotational operation of each motor 12 for drawing the trajectory, and the like.

In response to an instruction from operation and teaching unit 21, main controller 22 outputs position commands θ1c to θ6c of shafts J1 to J6 of robot 1 according to the trajectory of the movement of robot arm 2 and the like of robot mechanism 11 stored in operation and teaching unit 21.

Servo controller 23 controls the rotational operation of each of first to sixth motors 12 in robot mechanism 11 to follow position commands θ1c to θ6c sent from main controller 22.

Backlash correction blocks 25 are provided between main controller 22 and servo controllers 23 to correspond to joint portions J1 to J6. Backlash correction blocks 25 generate position command correction values θ1BL to θ6BL based on position commands θ1c to θ6c received from main controller 22. Generated position command correction values θ1BL to θ6BL are added to corresponding position commands θ1c to θ6c and are sent to first to sixth servo controllers 23, respectively. Stop flag signals (Stop_Flg) to be described later are input to backlash correction blocks 25.

Note that the functional blocks in robot control device 20 may be constituted by independent circuits or may be constituted by one integrated circuit. A combination of some functional blocks may be constituted by one integrated circuit.

Functions of main controller 22, servo controller 23, and backlash correction block 25 are substantially realized by executing a program described in software on an integrated circuit such as a CPU.

Figure 7:
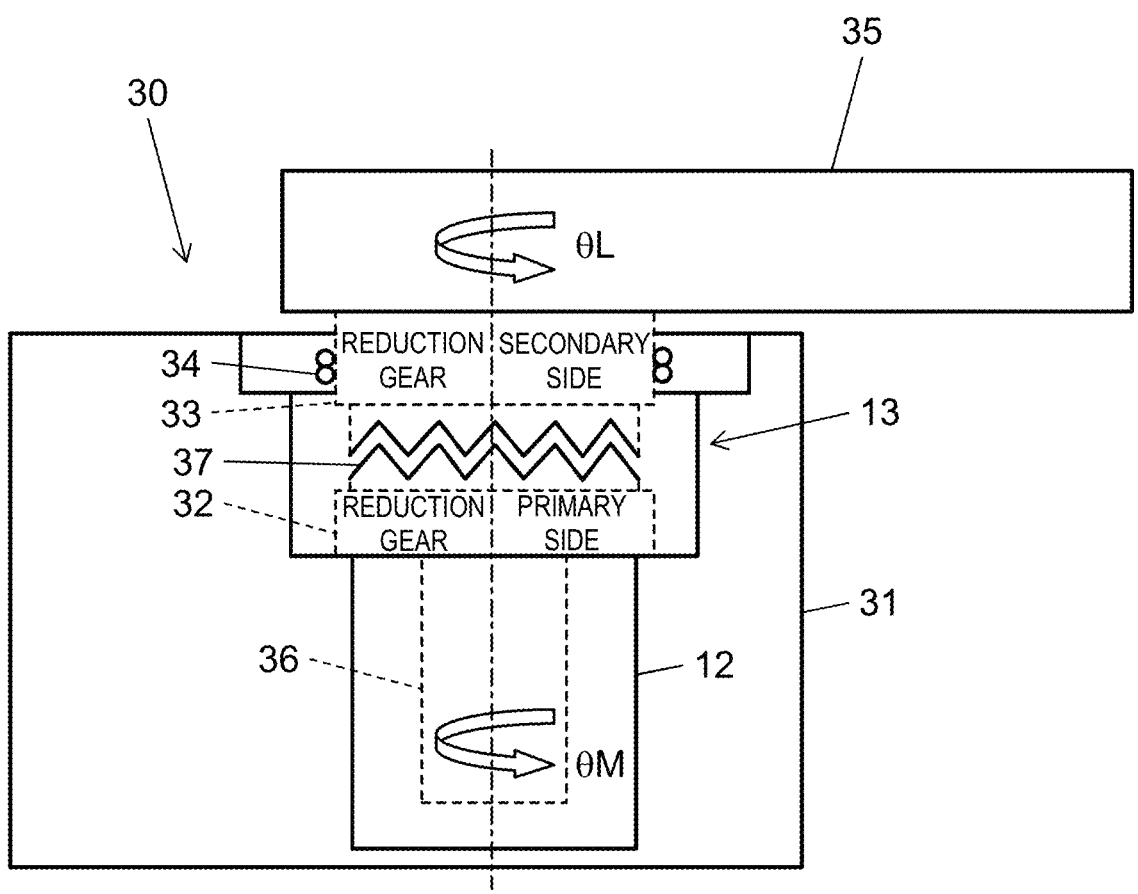
FIG. 7 is a diagram illustrating torsion of a reduction gear in a robot arm.

FIG. 7 is a diagram in which motors 12, reduction gears 13, and a part of robot arm 2 coupled thereto are extracted, as load 30, from robot mechanism 11.

Load 30 includes first arm 31 serving as a motor attachment base, motor 12 coupled to first arm 31, reduction gear 13 including primary side 32 coupled to motor 12 and secondary side 33 having bearing 34, and second arm 35 rotatably coupled to secondary side 33 of reduction gear 13.

Reduction gear primary side 32 is coupled to rotor 36 of motor 12 via the rotation shaft of motor 12, and rotates by motor rotation position θM sent from servo controller 23. Reduction gear 13 converts motor rotation position θM into arm rotation position θL at reduction ratio Rg. Reduction gear 13 has spring component 37 between reduction gear primary side 32 and reduction gear secondary side 33.

Note that position command θc indicates an angle command indicating a rotation angle amount of each shaft, and actual position θL indicates a rotation angle amount at which each shaft actually rotates.

<Detailed Configuration of Control Block of Articulated Robot>

Figure 8:
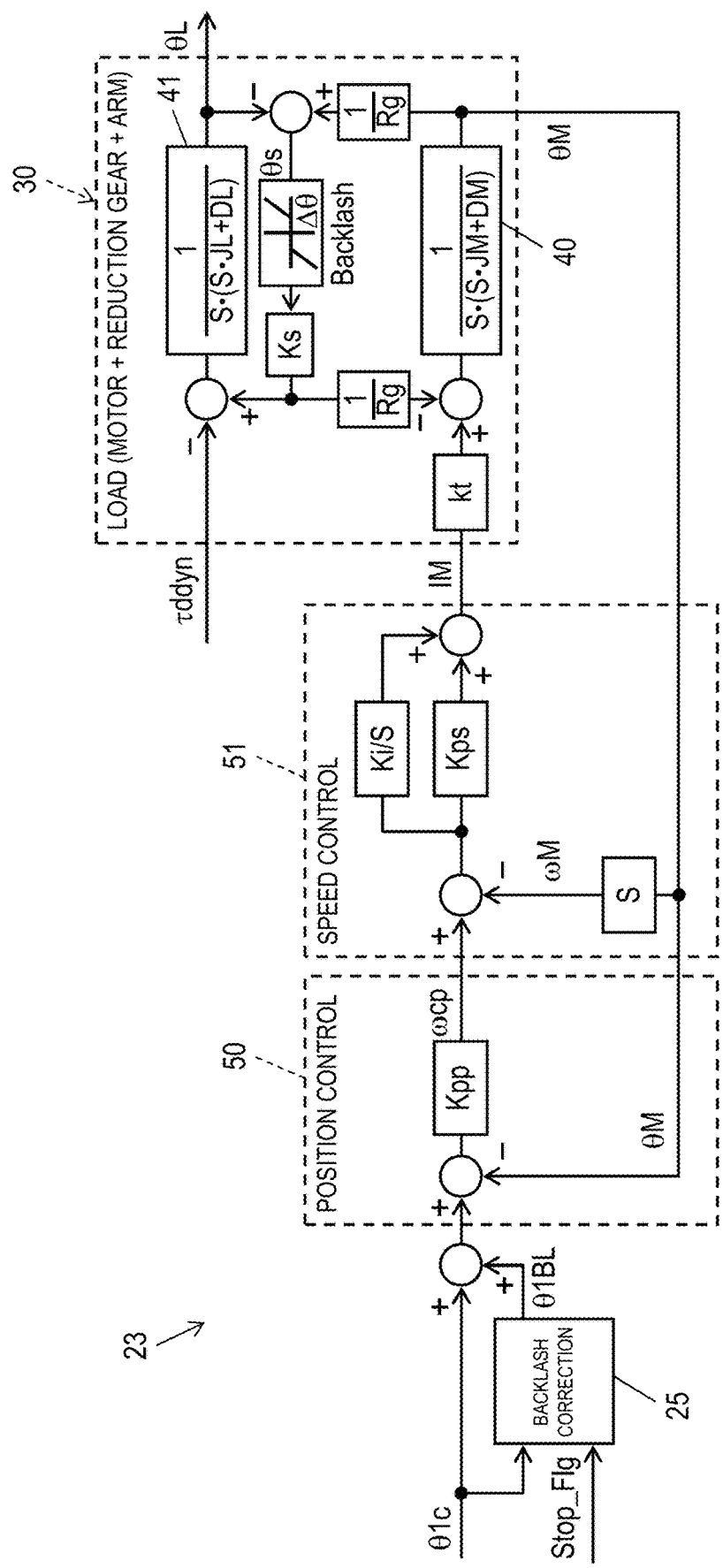
FIG. 8 is a block diagram of a robot control device.

FIG. 8 is a block diagram of the first servo controller. As illustrated in FIG. 8, position control block 50 of servo controller 23 generates speed command ωcp by subtracting motor position θM from a value obtained by adding position command θc and backlash correction value θ1BL output from backlash correction block 25 and multiplying the difference by position proportional gain Kpp. Motor position θM is obtained from a detection signal in first encoder 14 that is a position detector.

Note that, in the following description, although a configuration and the like of first servo controller 23 will be described as an example, the same applies to second to sixth servo controllers 23.

In speed control block 51, current IM flowing to first motor 12 is calculated by adding a value obtained by subtracting, from speed command ωcp, motor speed ωM obtained by differentiating motor position θM by speed proportional gain Kps and a value obtained by integrating the difference value and multiplying the integrated value by integrated speed gain Ki. Current IM is input to load 30.

In load 30, IM is a motor current command for driving motor 12, Kt is a torque constant of motor 12, 1/Rg is a reciprocal of the reduction ratio, Ks is a spring constant of reduction gear 13, θs is a torsion amount generated between reduction gear primary side 32 and reduction gear secondary side 33, and τddyn is an external force torque applied to robot arm 2.

Motor transfer function 40 and load transfer function 41 are obtained by formulating (modeling) physical phenomena.

In motor transfer function 40, JM is the moment of inertia about a rotation shaft of a combination of rotor 36 of motor 12 and reduction gear primary side 32, and DM is a viscous friction coefficient.

In load transfer function 41, JL is the moment of inertia about a rotation shaft of a combination of second arm 35 and reduction gear secondary side 33, and DL is a viscous friction coefficient.

Note that FIG. 8 is a general control block diagram of the motor to which the load and the reduction gear are coupled, and thus, detailed description of functions other than the above functions will be omitted.

Figure 9:
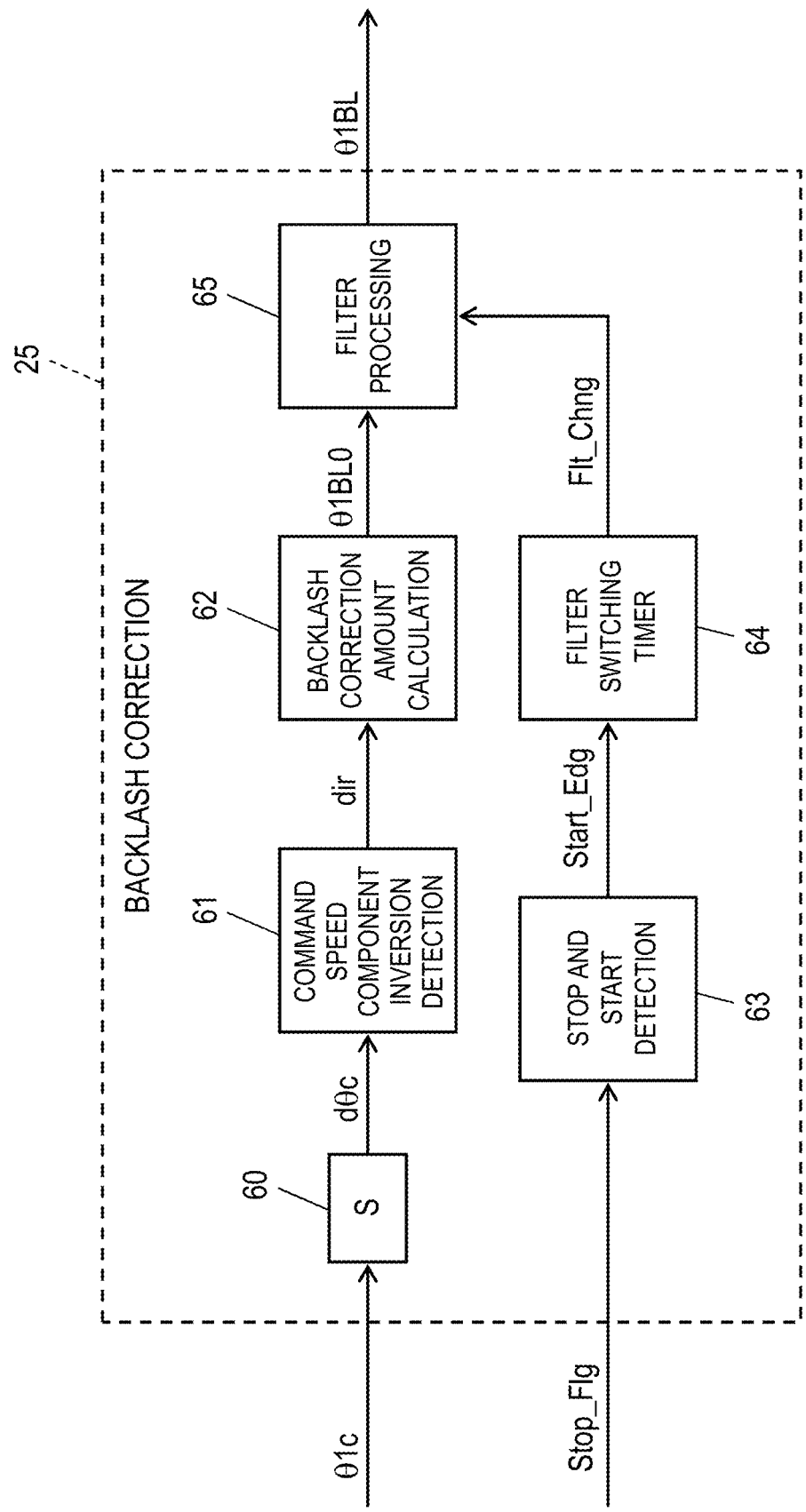
FIG. 9 is a block diagram of a backlash correction block.

FIG. 9 illustrates a detailed configuration of the backlash correction block. Backlash correction block 25 includes angular velocity calculation block 60, command speed component inversion detection block 61, backlash correction amount calculation block 62, stop and start detection block 63, filter switching timer block 64, and filter processing block 65.

Position command θ1c of joint portion J1 to be corrected is input to angular velocity calculation block 60. Angular velocity calculation block 60 calculates angular velocity component dθc that is a differential value of position command θ1c. Angular velocity component dθc is input to command speed component inversion detection block 61.

Command speed component inversion detection block 61 calculates inversion timing dir based on angular velocity component dθc. Inversion timing dir is input to backlash correction amount calculation block 62.

Backlash correction amount calculation block 62 calculates correction amount θ1BL0 of joint portion J1 based on inversion timing dir. Correction amount θ1BL0 is input to filter processing block 65.

A stop flag signal (Stop_Flg) is input to stop and start detection block 63. Stop flag signal (Stop_Flg) is a signal indicating whether or not robot 1 is in a stopped state or a non-stopped state (operation state). Specifically, stop flag signal (Stop_Flg) is "1" when joint portion J1 is in the stopped state, and is "0" when the joint portion is in the non-stopped state.

Stop and start detection block 63 outputs start edge signal (Start_Edg) based on stop flag signal (Stop_Flg). Start edge signal (Start_Edg) is a signal indicating whether a rotation direction of joint portion J1 is inverted from the stopped state or is inverted from the non-stopped state.

Specifically, start edge signal (Start_Edg) is "1" during one sample when stop flag signal (Stop_Flg) changes from "1" to "0", and is "0" when stop flag signal (Stop_Flg) does not change. Start edge signal (Start_Edg) is input to filter switching timer block 64.

Filter switching timer block 64 outputs filter switching signal (Flt_Chng) based on start edge signal (Start_Edg). Filter switching signal (Flt_Chng) is a signal indicating which of a low frequency filter and a high frequency filter is selected in order to change a frequency component of the correction amount.

Specifically, filter switching signal (Flt_Chng) is "1" when the low frequency filter is selected, and "0" when the high frequency filter is selected. Filter switching signal (Flt_Chng) is input to filter processing block 65.

Here, the low frequency is a frequency lower than a predetermined threshold value. The high frequency is a frequency higher than the low frequency. In the present exemplary embodiment, a resonance frequency (for example, 10 Hz) of joint portion J1 is set as a threshold value, the low frequency is set to 5 Hz, and the high frequency is set to 50 Hz.

Filter processing block 65 changes the frequency component of the correction amount based on correction amount θ1BL0 and filter switching signal (Flt_Chng).

Figure 11A:
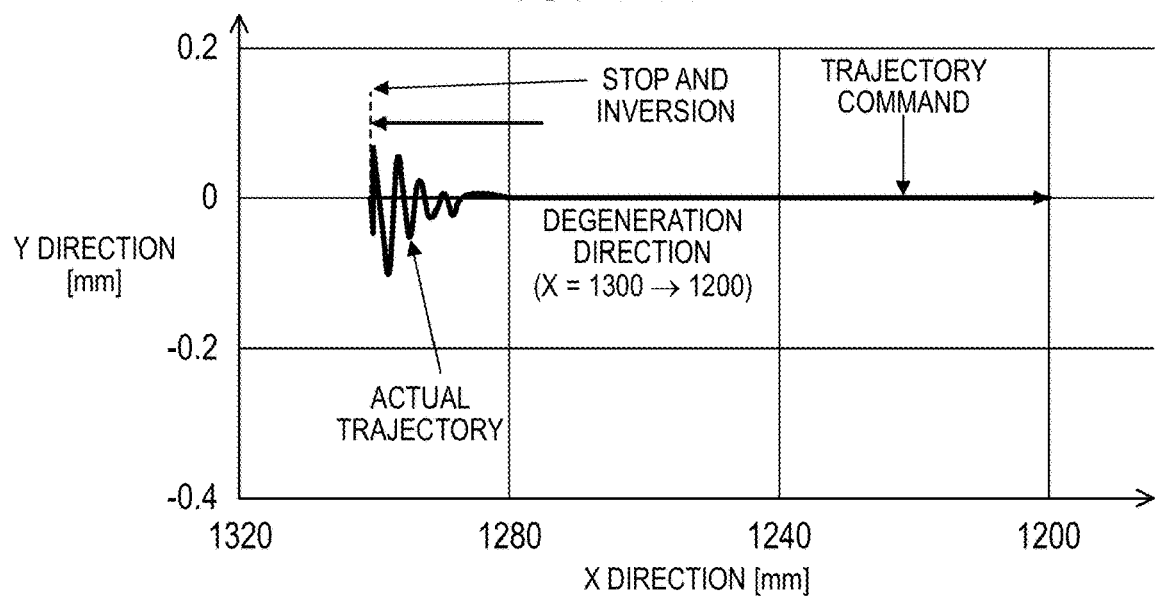
FIG. 11A is a diagram illustrating the actual trajectory in a case where the backlash correction amount is steeply changed when the joint portion is inverted from the stopped state.
Figure 11B:
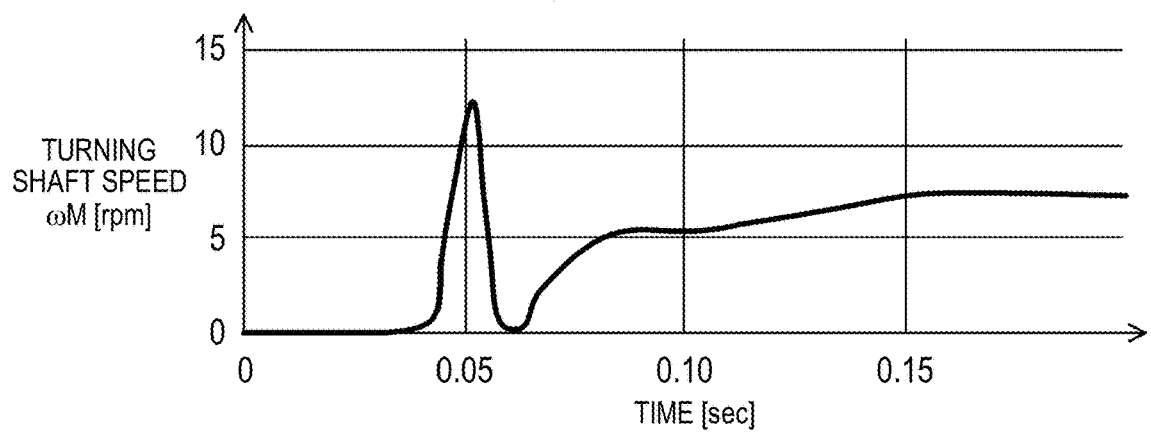
FIG. 11B is a graph showing the change in the turning shaft speed.
Figure 11C:
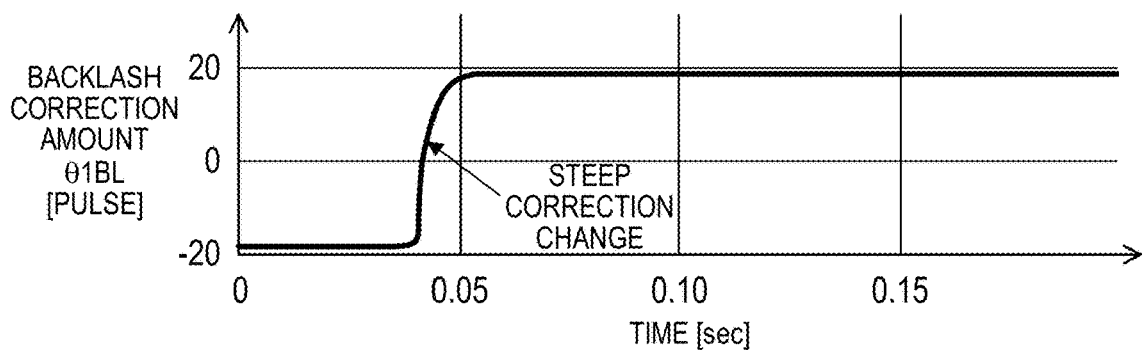
FIG. 11C is a graph showing the change in the backlash correction amount.

Specifically, when the high frequency filter (for example, 50 Hz) is selected based on filter switching signal (Flt_Chng), the correction amount changes steeply (see FIG. 11C).

Figure 12A:
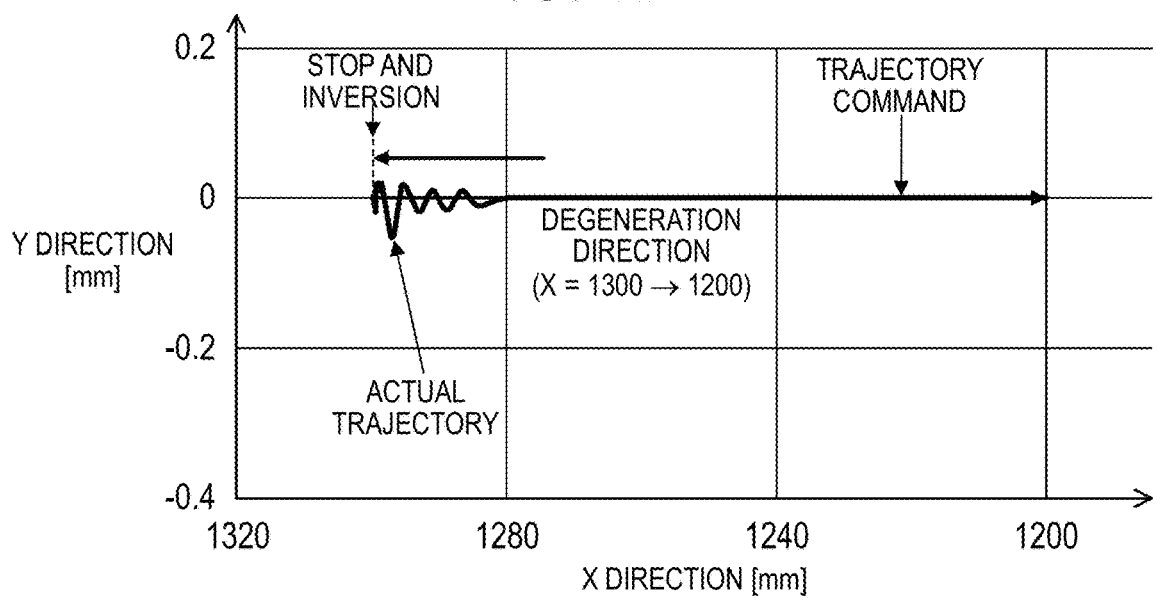
FIG. 12A is a diagram illustrating the actual trajectory in a case where the backlash correction amount is gently changed when the joint portion is inverted from the stopped state.
Figure 12B:
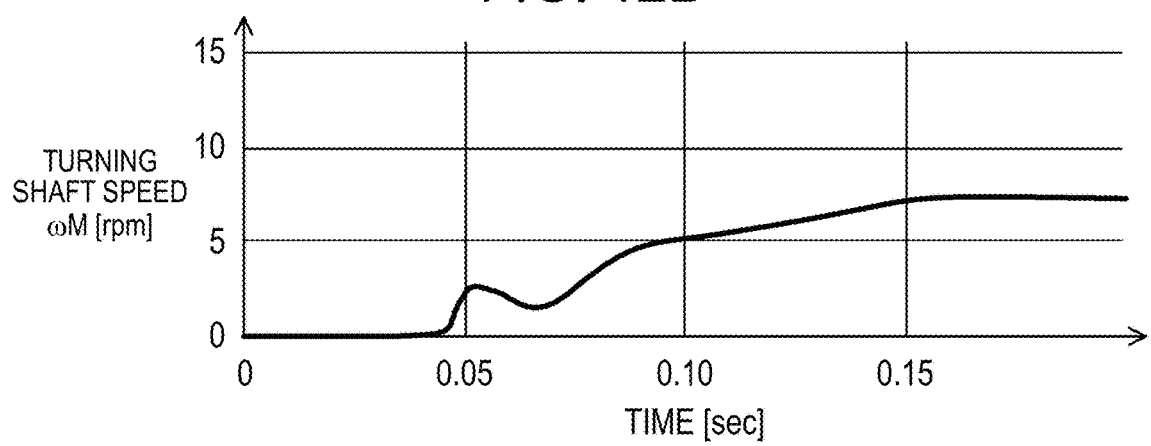
FIG. 12B is a graph showing the change in the turning shaft speed.
Figure 12C:
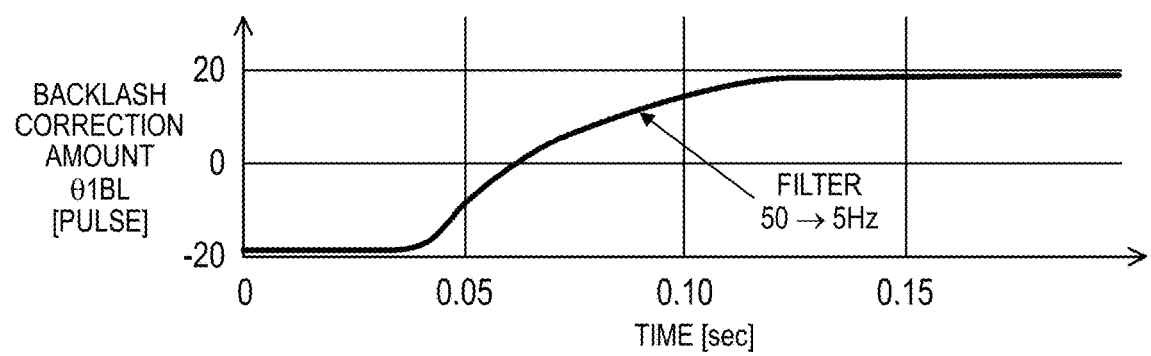
FIG. 12C is a graph showing the change in the backlash correction amount.

On the other hand, when the low frequency filter (for example, 5 Hz) is selected, the correction amount changes gradually (see FIG. 12C).

Filter processing block 65 outputs correction amount θ1BL of which the frequency component is changed.

A new position command obtained by adding correction amount θ1BL calculated by backlash correction block 25 to position command θ1c sent from main controller 22 to first servo controller 23 is input to first servo controller 23, and the driving of first motor 12 is controlled by first servo controller 23.

Hereinafter, the reason why the frequency component of the correction amount changes by determining whether joint portion J1 is in the non-stopped state or the stopped state before joint portion J1 is inverted will be described.

Figure 10A:
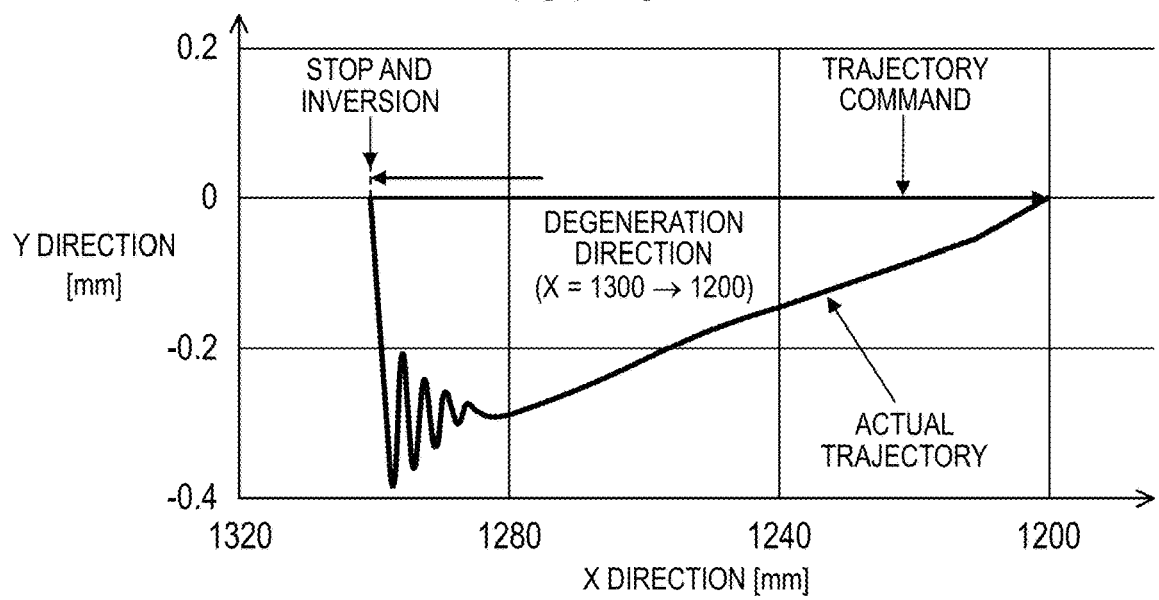
FIG. 10A is a diagram illustrating an actual trajectory in a case where backlash correction is not performed when a joint portion is inverted from a stopped state.

In the example shown in FIG. 10A, robot arm 2 stops at a position where a distal end portion of the robot arm is extended to a position of 1300 mm in an X direction (see FIG. 1). A trajectory command is given to joint portion J1 to degenerate the joint portion to a position of 1200 mm in the X direction.

Figure 10B:
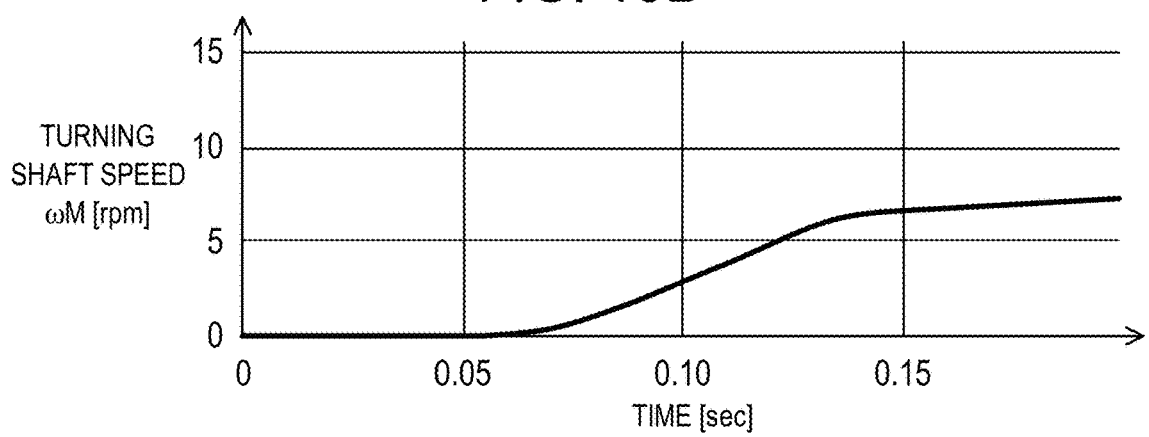
FIG. 10B is a graph showing a change in a turning shaft speed.
Figure 10C:
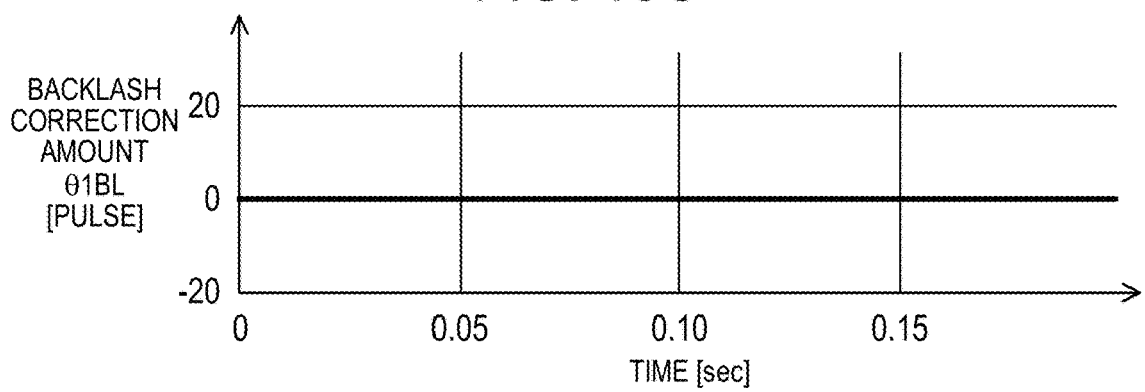
FIG. 10C is a graph showing the change in the backlash correction amount.

As illustrated in FIG. 10B, the rotational speed of joint portion J1 which is the turning shaft changes such that the speed gradually increases from the stopped state. At this time, the backlash correction of joint portion J1 is not performed (see FIG. 10C).

Thus, as illustrated in FIG. 10A, when joint portion J1 is inverted from the stopped state, the actual trajectory of the distal end portion of robot arm 2 is greatly shifted in a Y direction (see FIG. 1) due to the backlash error, and then changes gradually according to the trajectory command.

Subsequently, in the example illustrated in FIG. 11A, when joint portion J1 is inverted from the stopped state, the backlash correction amount is steeply changed (see FIG. 11C). Thus, as illustrated in FIG. 11B, the rotational speed of joint portion J1 is steeply increased from the stopped state and then decreased again, and thereafter, the rotational speed is gradually increased and then changed to a constant speed.

Thus, as illustrated in FIG. 11A, when joint portion J1 is inverted from the stopped state, the actual trajectory of the distal end portion of robot arm 2 is shifted in the Y direction, and then changes gradually according to the trajectory command.

Subsequently, in the example illustrated in FIG. 12A, when joint portion J1 is inverted from the stopped state, the backlash correction amount is gently changed (see FIG. 12C). Thus, as illustrated in FIG. 12B, the rotational speed of joint portion J1 is increased from the stopped state and then decreases again, and thereafter, the rotational speed is gradually increased and then changes to a constant speed.

Thus, as illustrated in FIG. 12A, when joint portion J1 is inverted from the stopped state, the actual trajectory of the distal end portion of robot arm 2 is shifted in the Y direction with a smaller variation range than the example illustrated in FIG. 11A, and then changes gradually according to the trajectory command.

As described above, when robot arm 2 is inverted from the stopped state, the backlash correction amount may be gently changed. As a result, it is possible to suppress an increase in the trajectory error due to the vibration of robot arm 2 caused by a large fluctuation in joint portion J1.

On the other hand, when robot arm 2 is inverted from the non-stopped state, the backlash correction amount may be steeply changed such that the timing of the backlash correction is not delayed.

Thus, in the present exemplary embodiment, the frequency component of the correction amount is changed by determining whether joint portion J1 is in the non-stopped state or the stopped state before joint portion J1 is inverted.

Figure 13A:
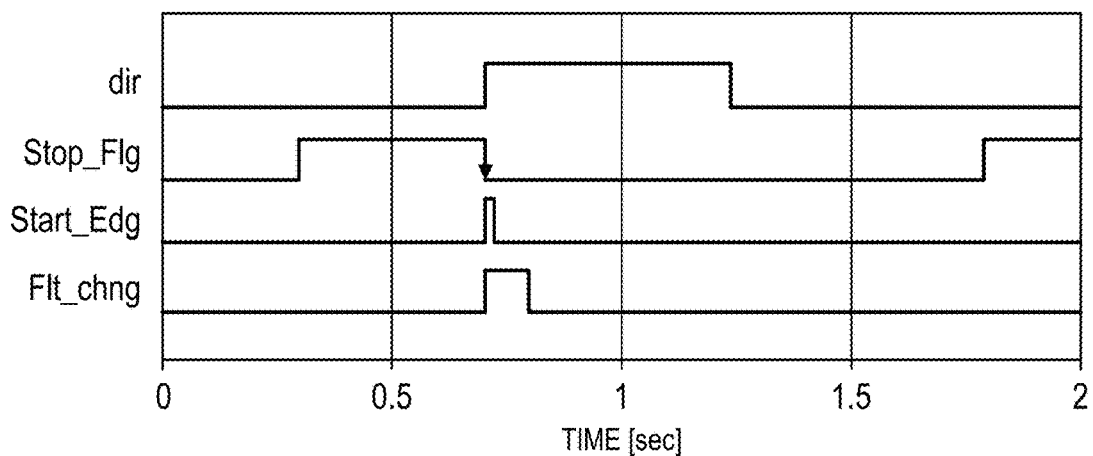
FIG. 13A is a timing chart illustrating switching between an inversion timing, a stop flag signal, a start edge signal, and a filter switching signal.

FIG. 13A illustrates switching timings of inversion timing dir, stop flag signal (Stop_Flg), start edge signal (Start_Edg), and filter switching signal (Flt_Chng).

Figure 13B:
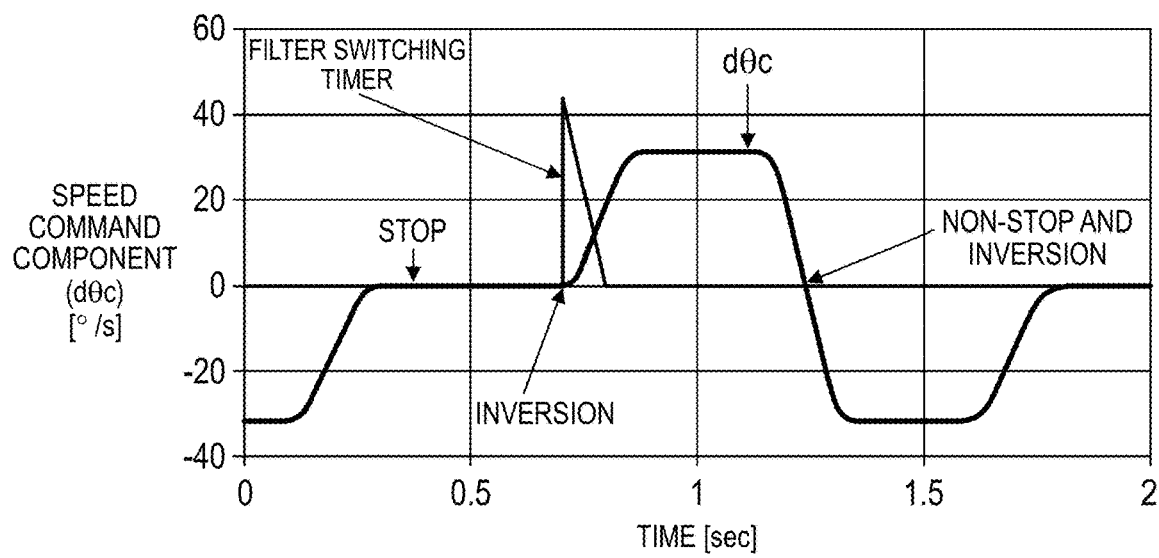
FIG. 13B is a graph showing a change in a speed command component.

As illustrated in FIG. 13B, while joint portion J1 is stopped, stop flag signal (Stop_Flg) becomes "1". When the inversion of joint portion J1 is detected based on inversion timing dir, the filter switching timer is started, and filter switching is performed within a predetermined set time.

Figure 13C:
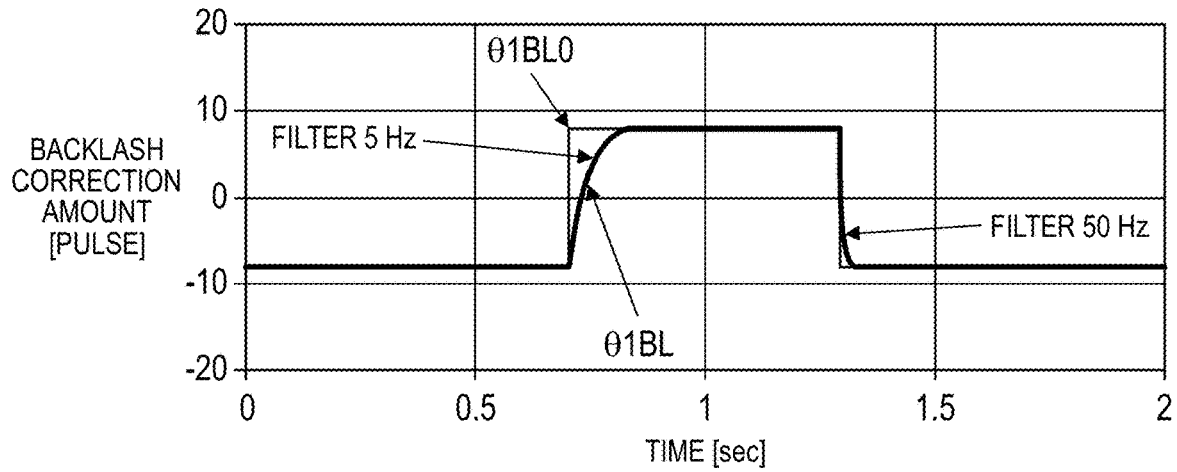
FIG. 13C is a graph showing the change in the backlash correction amount.

At this time, since joint portion J1 is inverted from the stopped state, the low frequency filter is selected within the set time. As illustrated in FIG. 13C, when the frequency component of the correction amount changes to the low frequency (5 Hz), the correction amount changes gently.

When robot arm 2 is moved in the circular orbit, since joint portion J1 is inverted from the non-stopped state, the high frequency filter is selected. As illustrated in FIG. 13C, when the frequency component of the correction amount changes to the high frequency (50 Hz), the correction amount changes steeply.

Next, as another operation example of robot arm 2, a case where joint portion J1 is temporarily stopped before joint portion J1 is inverted will be described.

Figure 14A:
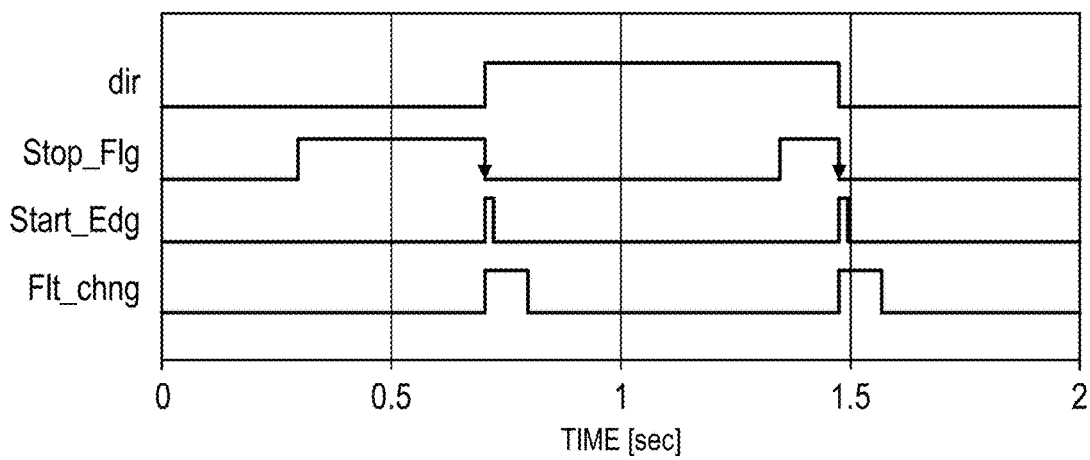
FIG. 14A is a timing chart illustrating switching between the inversion timing, the stop flag signal, the start edge signal, and the filter switching signal.

FIG. 14A illustrates switching timings of inversion timing dir, stop flag signal (Stop_Flg), start edge signal (Start_Edg), and filter switching signal (Flt_Chng).

Figure 14B:
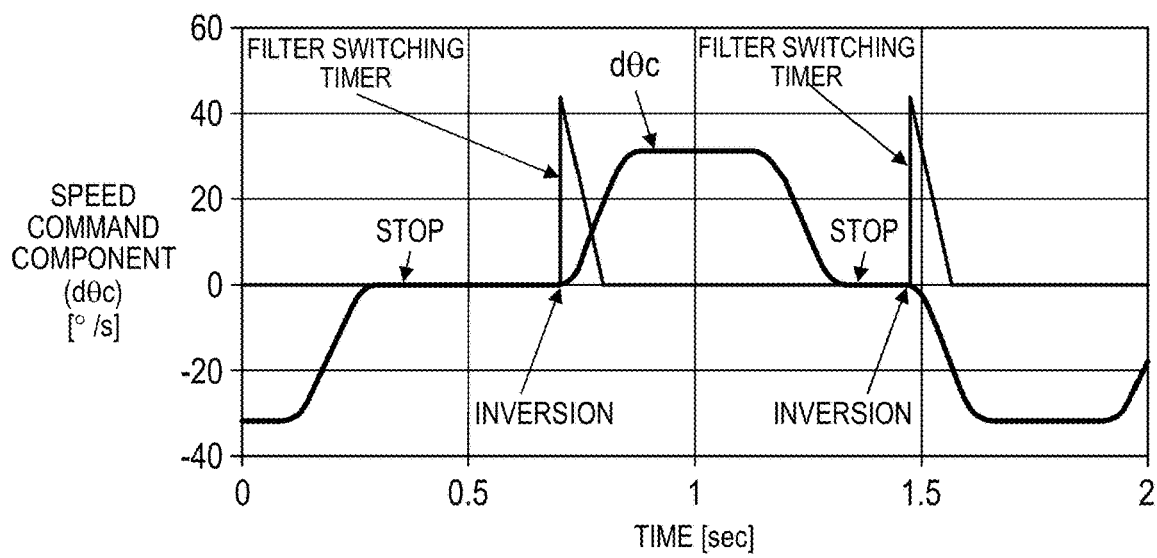
FIG. 14B is a graph showing the change in the speed command component.

As illustrated in FIG. 14B, while joint portion J1 is stopped, stop flag signal (Stop_Flg) becomes "1". When the inversion of joint portion J1 is detected based on inversion timing dir, the filter switching timer is started, and filter switching is performed within a predetermined set time.

Figure 14C:
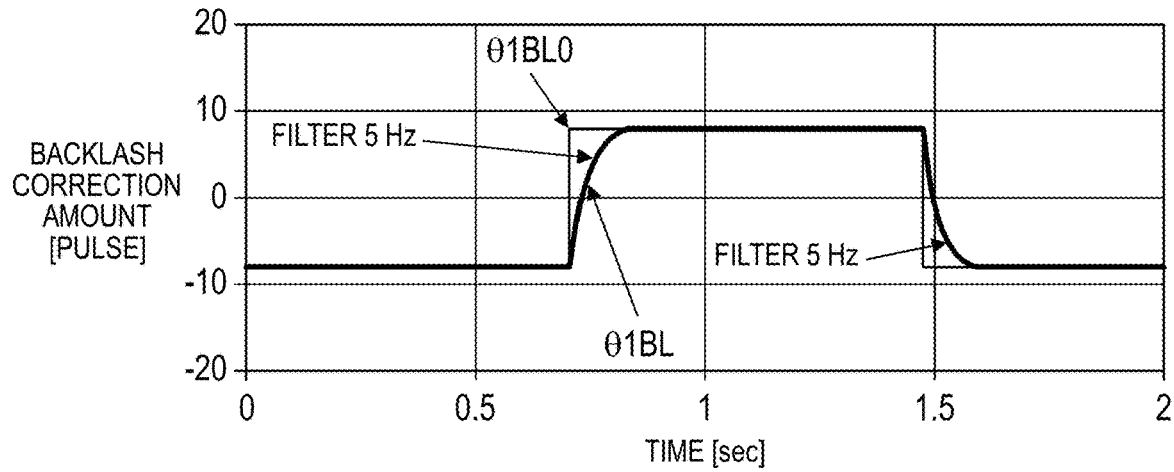
FIG. 14C is a graph showing the change in the backlash correction amount.

At this time, since joint portion J1 is inverted from the stopped state, the low frequency filter is selected within a filter switching time. As illustrated in FIG. 14C, when the frequency component of the correction amount changes to the low frequency (5 Hz), the correction amount changes gently.

Robot arm 2 is moved in the circular orbit, and joint portion J1 is temporarily stopped before a next inversion operation. Thus, since joint portion J1 is inverted from the stopped state, the low frequency filter is selected within the filter switching time. As illustrated in FIG. 14C, when the frequency component of the correction amount changes to the low frequency (5 Hz), the correction amount changes gently.

As described above, in accordance with robot control device 20 according to the present exemplary embodiment, when joint portion J1 is inverted in the middle of the operation, the correction amount can be steeply changed by increasing the frequency component of the correction amount such that the timing of the backlash correction is not delayed.

On the other hand, when joint portion J1 is inverted from the stopped state, the correction amount can be gently changed by lowering the frequency component of the correction amount such that the robot arm does not vibrate due to the large fluctuation in joint portion J1.

As a result, the trajectory error of the robot arm can be reduced.

Other Exemplary Embodiments

The above exemplary embodiment may have the following configuration.

In the present exemplary embodiment, although vertical articulated robot 1 having six shafts has been described as an example, the present invention is not particularly limited thereto. The number of joint portions of the robot is not limited to six, and may be appropriately changed according to specifications of the robot or the like.

INDUSTRIAL APPLICABILITY

As described above, the present disclosure is extremely useful and has high industrial applicability since a highly practical effect that the trajectory error of the robot arm can be reduced is obtained.

REFERENCE MARKS IN THE DRAWINGS

2: robot arm
20: robot control device
63: stop and start detection block (determination unit)
65: filter processing block (frequency changing unit)
J1 to J6: joint portion

The invention claimed is:

1. A robot control device for controlling an operation of a robot arm having a plurality of joint portions, the device comprising:
    a determination unit that receives a stop flag signal and determines whether or not a joint portion to be corrected among the plurality of joint portions is in a stopped state before a rotation direction of the joint portion to be corrected is inverted based on the stop flag signal; and
    a frequency changing unit that changes a frequency component of a correction amount for correcting backlash at the joint portion to be corrected to a low frequency lower than a predetermined threshold value when it is determined that the joint portion to be corrected is in the stopped state.

2. The robot control device according to claim 1, wherein the determination unit determines whether or not the joint portion to be corrected among the plurality of joint portions is in a middle of an operation before the rotation direction of the joint portion to be corrected is inverted, and
    the frequency changing unit changes the frequency component of the correction amount to a high frequency higher than the low frequency when it is determined that the joint portion to be corrected is in the middle of the operation.

3. A robot control method, of a robot control device that comprises a processor, for controlling an operation of a robot arm having a plurality of joint portions, the method comprising;

receiving, by the processor, a stop flag signal;

determining, by the processor, based on the stop flag signal, that a joint portion to be corrected among the plurality of joint portions is in a stopped state before a rotation direction of the joint portion be corrected is inverted;

changing, by the processor, a frequency component of a correction amount for correcting backlash at the joint portion to be corrected to a low frequency lower than a predetermined threshold value based on the determination.

4. The robot control method of claim 3, further comprising:

determining, by the processor, that the joint portion to be corrected among the plurality of joint portions is in a middle of an operation before the rotation direction of the joint portion to be corrected is inverted; and changing, by the processor, the frequency component of the correction amount to a high frequency higher than the low frequency when it is determined that the joint portion to be corrected is in the middle of the operation.

5. The robot control method of claim 4, further comprising:

inverting, by the processor, the rotation direction of the joint portion based on the correction amount.

* * * * *